(12) United States Patent
Ganesan et al.

(10) Patent No.: US 10,091,294 B2
(45) Date of Patent: Oct. 2, 2018

(54) NETWORKING COMPONENT MANAGEMENT IN HOST COMPUTING SYSTEMS IN A VIRTUAL COMPUTING ENVIRONMENT

(71) Applicant: VMWARE, INC., Palo Alto, CA (US)

(72) Inventors: Hariharan Jeyaraman Ganesan, Bangalore (IN); Jinto Antony, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 661 days.

(21) Appl. No.: 14/494,600

(22) Filed: Sep. 24, 2014

(65) Prior Publication Data

US 2016/0050115 A1 Feb. 18, 2016

(30) Foreign Application Priority Data

Aug. 13, 2014 (IN) ............................ 3979/CHE/2014

(51) Int. Cl.
*G06F 15/177* (2006.01)
*H04L 29/08* (2006.01)
*H04L 12/12* (2006.01)
*H04L 12/24* (2006.01)

(52) U.S. Cl.
CPC .......... *H04L 67/1097* (2013.01); *H04L 12/12* (2013.01); *H04L 41/0833* (2013.01); *Y02D 50/20* (2018.01); *Y02D 50/40* (2018.01)

(58) Field of Classification Search
CPC ............................ H04L 67/1097; H04L 12/12
USPC .................................................. 709/221, 220
See application file for complete search history.

(56) References Cited

U.S. PATENT DOCUMENTS

| | | | |
|---|---|---|---|
| 8,639,783 B1 | 1/2014 | Bakke et al. | |
| 8,984,621 B2 | 3/2015 | Burch et al. | |
| 2007/0283015 A1 | 12/2007 | Jackson et al. | |
| 2008/0239946 A1* | 10/2008 | Morita | H04L 41/0677 370/217 |
| 2009/0025007 A1 | 1/2009 | Hara et al. | |
| 2009/0150529 A1 | 6/2009 | Tripathi | |
| 2009/0238072 A1 | 9/2009 | Tripathi et al. | |
| 2010/0100878 A1 | 4/2010 | Otani | |
| 2010/0131636 A1 | 5/2010 | Suri et al. | |
| 2011/0299413 A1 | 12/2011 | Chatwani et al. | |
| 2012/0324442 A1 | 12/2012 | Barde | |
| 2013/0034021 A1 | 2/2013 | Jaiswal et al. | |
| 2013/0046892 A1 | 2/2013 | Otani | |
| 2013/0074066 A1 | 3/2013 | Sanzgiri et al. | |
| 2014/0036675 A1 | 2/2014 | Wang et al. | |
| 2014/0201554 A1 | 7/2014 | Yamazaki et al. | |
| 2014/0259015 A1 | 9/2014 | Chigusa et al. | |
| 2015/0277951 A1 | 10/2015 | Sundararaman et al. | |
| 2015/0293772 A1 | 10/2015 | Ganesan et al. | |

\* cited by examiner

*Primary Examiner* — Dustin Nguyen
*Assistant Examiner* — Joel Mesa

(57) ABSTRACT

Techniques for managing networking components in a host computing system in a virtual computing environment are described. The networking components include virtual switches and physical network interface cards (NICs). In one embodiment, a virtual switch that is not coupled to any running virtual machines in a host computing system is identified. Further, physical NICs associated with the virtual switch are identified. Furthermore, the virtual switch and the physical NICs associated with the virtual switch are placed into a standby mode.

15 Claims, 4 Drawing Sheets

NETWORKING COMPONENT MANAGEMENT IN HOST COMPUTING SYSTEMS IN A VIRTUAL COMPUTING ENVIRONMENT

RELATED APPLICATIONS

Benefit is claimed under 35 U.S.C. 119(a)-(d) to Foreign application Serial No. 3979/CHE/2014 filed in India entitled "NETWORKING COMPONENT MANAGEMENT IN HOST COMPUTING SYSTEMS IN A VIRTUAL COMPUTING ENVIRONMENT", filed on Aug. 13, 2014, by VMware, Inc. which is herein incorporated in its entirety by reference for all purposes.

BACKGROUND

Computer virtualization is a technique that involves encapsulating a representation of a physical computing machine platform into a virtual machine (VM) that is executed under the control of virtualization software running on hardware computing platforms (also referred to herein as "hosts" or "host computing systems"). A group of hardware computing platforms may be organized as a cluster to provide computing resources, such as memory, central processing units (CPUs) and so on, for VMs. In a data center, it is common to see multiple physical network switches and multiple VMs running on multiple clusters of host computing systems with each host computing system coupled to one or more of the physical network switches.

Generally, VMs are connected to the physical network switches via networking components, such as virtual switches and associated physical network interface cards (NICs). Typically, the VMs include virtual network interface cards (VNICs) that are connected to associated virtual switch ports. Virtual switches are then connected to physical NICs in the host computing system to connect the VMs to the physical network switches. The virtual switches and physical NICs may consume computing resources and/or power. Also, the virtual switches with free virtual switch ports may be exposed to security attacks.

DETAILED DESCRIPTION

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Embodiments described herein provide enhanced computer-based and network-based methods, techniques, and systems for managing networking components in a host computing system in a virtual computing environment. The networking components include virtual switches and associated physical network interface cards (NICs). The term "virtualized computing environment" is used herein to refer to a physical infrastructure that hosts a virtual infrastructure comprising virtual objects such as virtual machines (VMs), virtual data centers (VDCs), an aggregation of VMs (vApp) and virtual appliances. The term "VM" refers to software based emulation of a physical machine (e.g., a computer) that executes programs like the physical machine. The VM includes a set of specification and configuration files and uses computing resources (e.g., central processing units (CPUs), memory and the like) of the physical machine. Further, the VM includes virtual devices that provide functionalities similar to physical hardware. The term "virtual switch" refers to a software program that allows communication between VMs. Virtual switches are networking components in a host computing system, connecting physical NICs in the host computing system to virtual network interface cards in the VMs.

Typically in the virtual computing environment, virtual switches, with running VMs or no running VMs, consume computing resources (e.g., central processing units (CPUs), memory and the like) of a host computing system. Further, physical NICs associated with the virtual switches consume power. Also, open virtual switch ports associated with the virtual switches may expose to security attacks (i.e., open virtual switch ports can be exploited by external applications).

Example embodiments identify a virtual switch that is not coupled to any running VMs in the host computing system. Further, example embodiments identify physical NICs associated with the virtual switch. Furthermore, example embodiments place the virtual switch and the physical NICs into a standby mode.

System Overview and Examples of Operation

Figure 1:
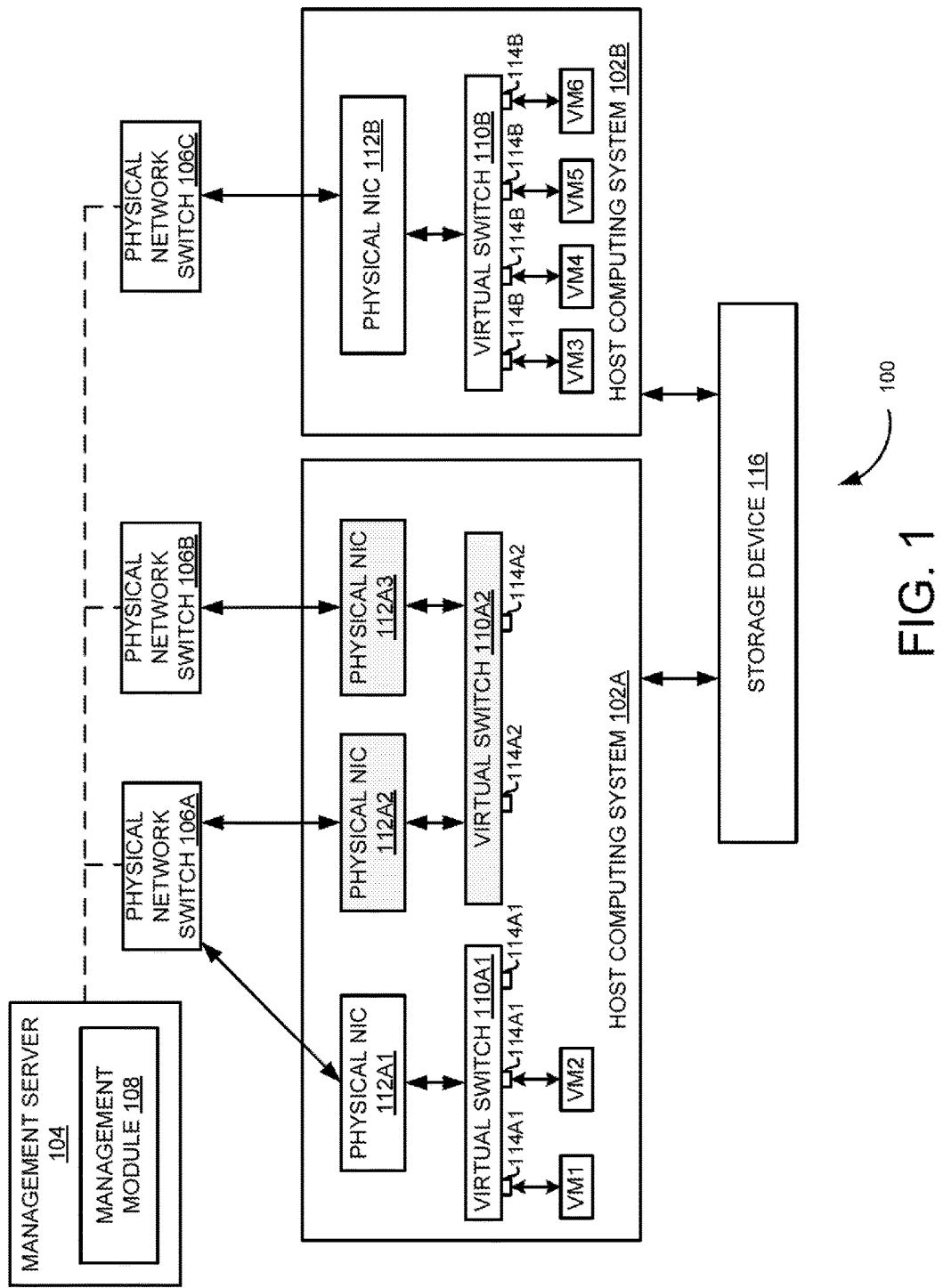
FIG. 1 is a block diagram illustrating a system for managing networking components in a host computing system in a virtual computing environment, according to an example embodiment.

FIG. 1 is a block diagram illustrating a system for managing networking components in host computing system 102A in virtual computing system 100, according to an example embodiment. In an example illustrated in FIG. 1, virtual computing environment 100 includes host computing systems 102A and 102B and associated VMs 1-6 in a cluster. VMs 1-6 are hosted by associated host computing systems 102A and 102B via associated virtual switches 110A and 110B and virtual switch ports 114A1 and 114B.

Further, virtual computing environment 100 includes physical network switches 106A, 106B and 106C and management server 104 communicatively coupled to physical network switches 106A, 106B and 106C. The term "physical network switch" is used in the description, however, in the present invention it is used broadly to refer to any physical network device capable of routing/carrying the network traffic such as routers, switches, multi-function devices having a routing function, edge gateways, and so on.

Furthermore, virtual switch 110A is connected to physical NIC 112A1 in host computing system 102A to connect VMs 1 and 2 to physical network switch 106A. Similarly, virtual switch 110B is connected to physical NIC 112B in host computing system 102B to connect VMs 3-6 to physical network switch 106C. However, virtual switch 110A2 associated with the host computing system 102A is not coupled to any running VMs. In other words, virtual switch 110A2 is not carrying any network traffic. Therefore, all the virtual switch ports 114A2 associated with the virtual switch 110A2 are free. Further, the virtual switch 110A2 is connected to physical NICs 112A2 and 112A3 that are connected to physical network switches 106A and 106B, respectively.

Management server 104 includes management module 108. One skilled in the art can appreciate that management module 108 can also be provided in a VM or virtual application that can run on any host computing system and can be provided to a user through a graphical user interface as a part of management software. In operation, management module 108 identifies virtual switch 110A2 that is not coupled to any running VMs. Further, management module 108 identifies physical NICs 112A2 and 112A3 that are associated with virtual switch 110A2.

Furthermore, management module 108 places virtual switch 110A2 and physical NICs 112A2 and 112A3 into a standby mode, thereby managing resource, security and power for virtual switch 110A2 and physical NICs 112A2 and 112A3. In an example embodiment, management module 108 writes process data associated with virtual switch 110A2 to storage device 116 associated with host computing system 102A. For example, storage device 116 includes a disk drive (e.g., a hard disk drive) or a solid-state drive external to host computing system 102A. Upon writing the process data to storage device 116, management module 108 places virtual switch 110A2 into the standby mode. In one example, placing virtual switch 110A2 into the standby mode includes marking a status of virtual switch 110A2 as the standby mode. In one embodiment, management module 108 places physical NICs 112A2 and 112A3 into the standby mode using a power saving option provided by a physical NIC vendor. For example, the standby mode associated with physical NICs includes a powered-off mode or a low power mode.

In some embodiments, management module 108 identifies any request for powering on VMs associated with virtual switch 110A2 after placing virtual switch 110A2 and physical NICs 112A2 and 112A3 into the standby mode. Further, management module 108 places virtual switch 110A2 and physical NICs 112A2 and 112A3 into an active mode. For example, the active mode associated with physical NICs includes a powered-on mode. In an example implementation, management module 108 copies the process data associated with virtual switch 110A2 from storage device 116 to host computing system 102A (e.g., memory of host computing system 102A). Upon copying the process data associated with virtual switch 110A2 to host computing system 102A, management module 108 places virtual switch 110A2 into the active mode. In one example, placing virtual switch 110A2 into the active mode includes marking the state of virtual switch 110A2 as the active mode. Furthermore, management module 108 power on the requested VMs associated with virtual switch 110A2.

Also, although certain terms are used primarily herein, other terms could be used interchangeably to yield equivalent embodiments and examples. For example, it is well-known that equivalent terms in the field of system virtualization or similar or related fields could be substituted for such terms as "physical computer," "hypervisor," "virtual machine," or the like. The terms "resource" and "computing resource" are used interchangeably throughout the document. The terms "physical machine" and "host computing system" are used interchangeably throughout the document.

Numerous specific details are set forth herein, such as data formats and code sequences, and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described are not limited by the particular order, selection, or decomposition of aspects described with reference to any particular routine, module, component, or the like.

Example Processes

Figure 2:
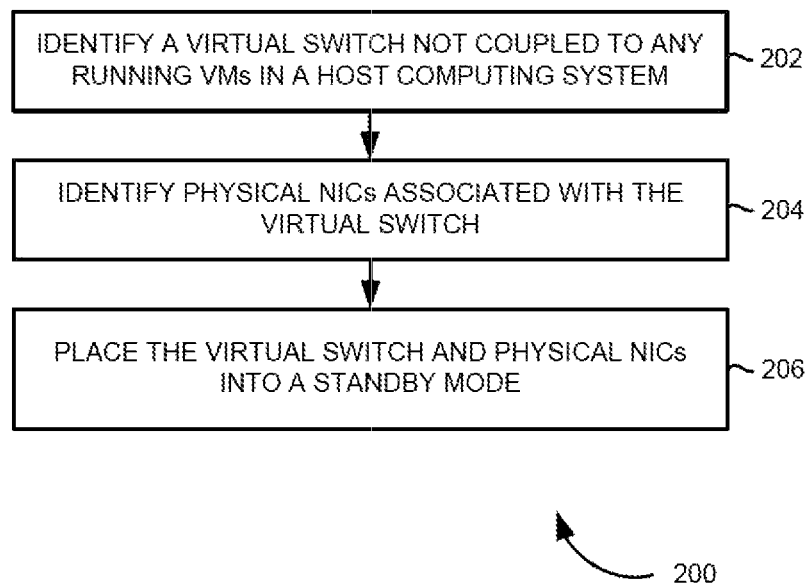
FIG. 2 is a flow diagram of a process for managing networking components in a host computing system in a virtual computing environment, according to an example embodiment.

FIG. 2 is flow diagram 200 of a process for managing networking components in a host computing system in a virtual computing environment, according to an example embodiment. The networking components include virtual switches and associated physical NICs. At block 202, a virtual switch that is not coupled to any running VMs in the host computing system is identified. At block 204, physical NICs associated with the virtual switch are identified. In one example, one or more physical NICs associated with the virtual switch are identified. At block 206, the virtual switch and the physical NICs are placed into a standby mode. In an example embodiment, process data associated with the virtual switch is written to a storage device associated with the host computing system. For example, the storage device includes a disk drive (e.g., a hard disk drive) or a solid-state drive external to the host computing system. Upon writing the process data associated with the virtual switch to the storage device, the virtual switch is placed into the standby mode.

In some embodiments, any request for powering on VMs associated with the virtual switch is identified after placing the virtual switch and the physical NICs into the standby mode. Further, the virtual switch and the physical NICs are placed into an active mode. In an example embodiment, the process data associated with the virtual switch is copied from the storage device to the host computing system. Upon copying the process data to the host computing system, the virtual switch is placed into the active mode. Furthermore, the requested VMs associated with the virtual switch are powered on.

Figure 3:
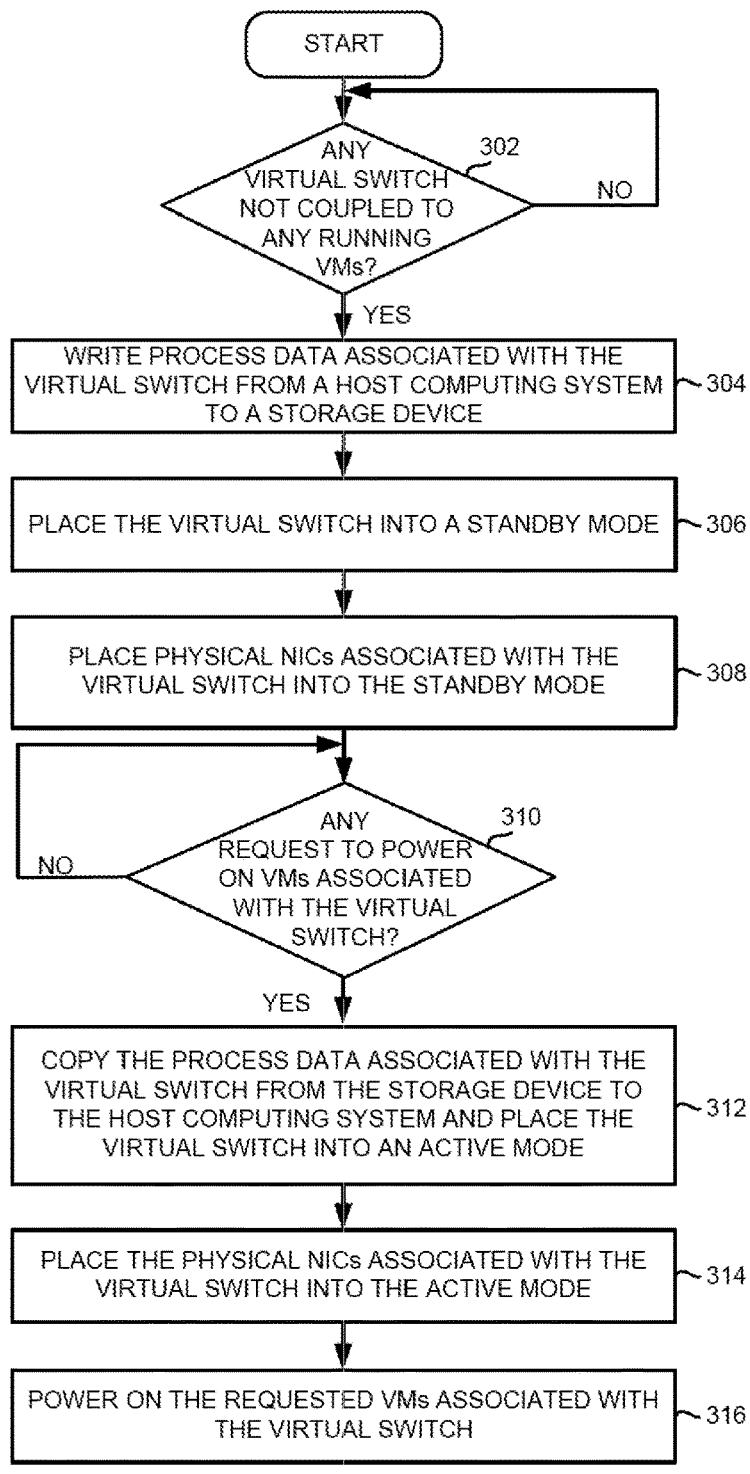
FIG. 3 is another flow diagram of a process for managing networking components in a host computing system in a virtual computing environment, according to an example embodiment.

Referring now to FIG. 3, which is flow diagram 300 illustrating a detailed process for managing networking components in a host computing system in a virtual computing environment, according to an example embodiment. At block 302, a check is made to identify whether any of virtual switches is not coupled to any running VMs in the host computing system. If all the virtual switches are coupled to one or more running VMs in the host computing system, process step at block 302 is repeated after a predetermined time interval. If a virtual switch that is not coupled to any running VMs is identified, process data associated with the virtual switch is written to a storage device associated with the host computing system at block 304. At block 306, the virtual switch is placed into a standby mode. In one example, placing the virtual switch into the standby mode includes marking a state of the virtual switch as the standby mode. At block 308, physical NICs associated with the virtual switch are placed into the standby mode. In one example embodiment, the physical NICs associated with the virtual switch are identified and the physical NICs are then placed into the standby mode.

At block 310, a check is made to identify any request for powering on VMs associated with the virtual switch after placing the virtual switch and the physical NICs into the standby mode. If no request is made for powering on VMs associated with the virtual switch after placing the virtual switch and the physical NICs into the standby mode, the process step at block 310 is repeated. If a request is made for powering on the VMs associated with the virtual switch, the process data associated with the virtual switch is copied from the storage device to the host computing system at block 312. Further, the virtual switch is placed into an active mode. In one example, placing the virtual switch into the active mode includes marking the state of the virtual switch as the active mode. At block 314, the physical NICs associated with the virtual switch are placed into the active mode. At block 316, the requested VMs associated with the virtual switch are powered on.

In various embodiments, the systems and methods described in FIGS. 1 through 3 propose a technique to manage resource, security and power for networking components in a host computing system by placing the networking components into a standby mode when the networking components are not coupled to any running VMs in the host computing system. In one example, placing virtual switch into the standby mode reduces computing resource utilization of the host computing system and also reduces security attacks as the free ports are not available in the virtual switch. In another example, placing physical NICs into the standby mode reduces power utilization.

Example Computing System Implementation

Figure 4:
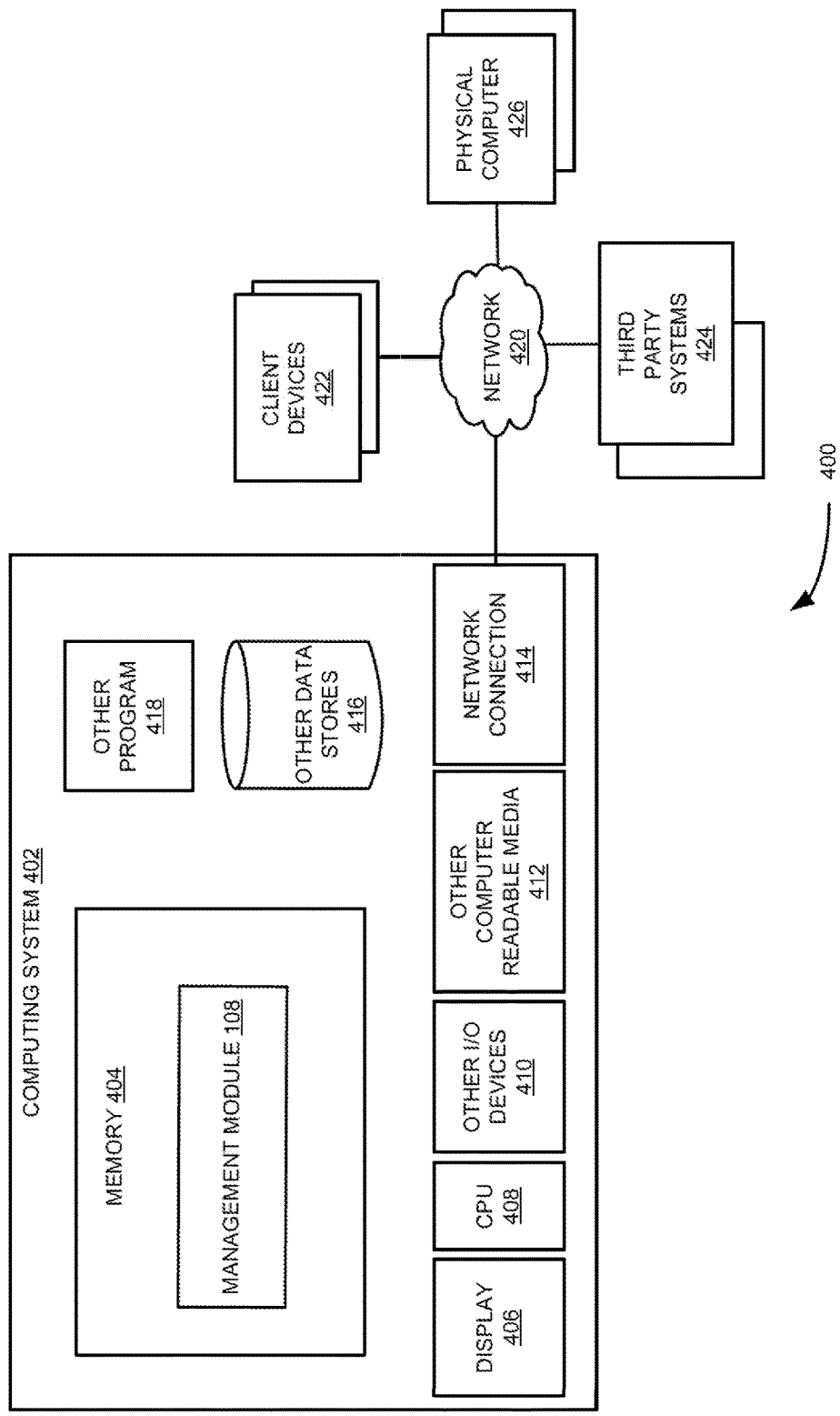
FIG. 4 is a block diagram of a computing system for managing networking components in the host computing system in the virtual computing environment, according to an example embodiment.

FIG. 4 is a block diagram 400 of an example computing system for managing networking components in a host computing system in a virtual computing environment, according to an example embodiment. In particular, FIG. 4 shows computing system 402 that may be utilized to implement management module 108, such as shown in FIG. 1.

Note that one or more general purpose virtual or physical computer systems suitably instructed may be used to implement management module 108 (shown in FIG. 1). In addition, computing system 402 may comprise one or more distinct computing systems/devices and may span distributed locations. Furthermore, each block shown may represent one or more such blocks as appropriate to a specific embodiment or may be combined with other blocks. Also, management module 108 may be implemented in software, hardware, firmware, or in some combination to achieve the capabilities described herein.

In the embodiment shown, computing system 402 may comprise computer memory ("memory") 404, display 406, one or more Central Processing Units ("CPU") 408, Input/output (I/O) devices 410 (e.g., keyboard, mouse, etc.), other computer-readable media 412, and network connections 414. Management module 108 is shown residing in memory 404. The components of management module 108 may execute on one or more CPUs 408 and implement techniques described herein. Other code or programs 418 (e.g., an administrative interface, a Web server, and the like) and potentially other data repositories, such as data store 416, may also reside in memory 404, and execute on one or more CPUs 408. One or more of the components in FIG. 4 may not be present in any specific implementation. For example, some embodiments may not provide other computer readable media 412 or display 406.

Management module 108 interacts via network 420 with client devices 422, physical computers 426, and/or third-party systems/applications 424. Network 420 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi. WiMAX) that facilitate communication to and from remotely situated humans and/or devices.

As discussed above with reference to FIG. 1, management module 108 manages networking components in the host computing system in the virtual computing environment. The architecture shown in FIG. 4 may in some embodiments be partially or fully virtualized. For example, computing system 402 may be one or possibly many VMs executing on physical hardware and managed by a hypervisor, virtual machine monitor, or similar technology. Also, physical computers 426 may include virtualization logic to manage multiple VMs.

In an example embodiment, components/modules of management module 108 are implemented using standard programming techniques. For example, management module 108 may be implemented as a "native" executable running on CPU 408, along with one or more static or dynamic libraries. In other embodiments, management module 108 may be implemented as instructions processed by a VM that executes as one of other programs 418.

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

Furthermore, in some embodiments, some or all of the components of management module 108 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable storage medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Further, from the foregoing it will be appreciated that, although specific embodiments have been described herein for purposes of illustration, various modifications may be made without deviating from the spirit and scope of this disclosure. For example, the methods, techniques, and systems for managing networking components in the host computing system in the virtual computing environment are applicable to other architectures or in other settings. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for managing networking components in a host computing system in a virtual computing environment, wherein the networking components comprise virtual switches and physical network interface cards (NICs), the method comprising:
   identifying a virtual switch not coupled to any running virtual machines in the host computing system;
   identifying physical NICs associated with the virtual switch, wherein the virtual switch and the physical NICs associated with the virtual switch reside in the host computing system; and
   placing the virtual switch and the physical NICs associated with the virtual switch into a standby mode when the virtual switch is not coupled to any running virtual machines in the host computing system.

2. The method of claim 1, wherein placing the virtual switch into a standby mode, comprises:
   writing process data associated with the virtual switch to a storage device associated with the host computing system; and
   placing the virtual switch into the standby mode upon writing the process data associated with the virtual switch to the storage device.

3. The method of claim 2, wherein the storage device comprises at least a disk drive or a solid-state drive external to the host computing system.

4. The method of claim 1, further comprising:
   identifying any request for powering on virtual machines associated with the virtual switch after placing the virtual switch and the physical NICs associated with the virtual switch into the standby mode;
   placing the virtual switch and the physical NICs associated with the virtual switch into an active mode; and
   powering on the requested virtual machines associated with the virtual switch.

5. The method of claim 4, wherein placing the virtual switch into an active mode, comprises:
   copying process data associated with the virtual switch from a storage device to the host computing system; and
   placing the virtual switch into the active mode upon copying the process data associated with the virtual switch from the storage device.

6. A system, comprising:
   a host computing system executing multiple virtual machines; and
   a management server communicatively coupled to the host computing system, wherein the management server manages networking components in the host computing system, wherein the networking components comprise virtual switches and physical network interface cards (NICs), by:
      identifying a virtual switch not coupled to any running virtual machines;
      identifying physical NICs associated with the virtual switch, wherein the virtual switch and the physical NICs associated with the virtual switch reside in the host computing system; and
      placing the virtual switch and the physical NICs associated with the virtual switch into a standby mode when the virtual switch is not coupled to any running virtual machines in the host computing system.

7. The system of claim 6, wherein the management server is further configured to:
   write process data associated with the virtual switch to a storage device associated with the host computing system; and
   place the virtual switch into the standby mode upon writing the process data associated with the virtual switch to the storage device.

8. The system of claim 7, wherein the storage device comprises at least a disk drive or a solid-state drive external to the host computing system.

9. The system of claim 6, wherein the management server is further configured to:
   identify any request for powering on virtual machines associated with the virtual switch after placing the virtual switch and the physical NICs associated with the virtual switch into the standby mode;
   place the virtual switch and the physical NICs associated with the virtual switch into an active mode; and
   power on the requested virtual machines associated with the virtual switch.

10. The system of claim 9, wherein the management server is configured to:
    copy process data associated with the virtual switch from a storage device to the host computing system; and
    place the virtual switch into the active mode upon copying the process data associated with the virtual switch from the storage device.

11. A non-transitory computer-readable storage medium including instructions that are configured, when executed by a computing device, to perform a method for managing networking components in a host computing system in a virtual computing environment, wherein the networking components comprise virtual switches and physical network interface cards (NICs), the method comprising:
    identifying a virtual switch not coupled to any running virtual machines in the host computing system;
    identifying physical NICs associated with the virtual switch, wherein the virtual switch and the physical NICs associated with the virtual switch reside in the host computing system; and
    placing the virtual switch and the physical NICs associated with the virtual switch into a standby mode when the virtual switch is not coupled to any running virtual machines in the host computing system.

12. The non-transitory computer-readable storage medium of claim 11, wherein placing the virtual switch into a standby mode, comprises:

writing process data associated with the virtual switch to a storage device associated with the host computing system; and placing the virtual switch into the standby mode upon writing the process data associated with the virtual switch to the storage device.

13. The non-transitory computer-readable storage medium of claim 12, wherein the storage device comprises at least a disk drive or a solid-state drive external to the host computing system.

14. The non-transitory computer-readable storage medium of claim 11, further comprising;

identifying any request for powering on virtual machines associated with the virtual switch after placing the virtual switch and the physical N ICs associated with the virtual switch into the standby mode;

placing the virtual switch and the physical NICs associated with the virtual switch into an active mode; and powering on the requested virtual machines associated with the virtual switch.

15. The non-transitory computer-readable storage medium of claim 14, wherein placing the virtual switch into an active mode, comprises:

copying process data associated with the virtual switch from a storage device to the host computing system; and placing the virtual switch into the active mode upon copying the process data associated with the virtual switch from the storage device.

\* \* \* \* \*